(12) United States Patent
Kim et al.

(10) Patent No.: US 7,656,482 B2
(45) Date of Patent: Feb. 2, 2010

(54) TRANSFLECTIVE LIQUID CRYSTAL DISPLAY AND PANEL THEREFOR

(75) Inventors: Seong-Ho Kim, Yongin-si (KR);
Sung-Hwan Cho, Gyeonggi-do (KR);
Jae-Hyun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 254 days.

(21) Appl. No.: 11/560,551

(22) Filed: Nov. 16, 2006

(65) Prior Publication Data
US 2007/0195238 A1    Aug. 23, 2007

(30) Foreign Application Priority Data
Feb. 22, 2006    (KR)    ............ 10-2006-0017149

(51) Int. Cl.
*G02F 1/1335*    (2006.01)
*G02F 1/13*    (2006.01)
(52) U.S. Cl. .................. 349/114; 349/106; 349/113
(58) Field of Classification Search ............... None
See application file for complete search history.

(56) References Cited

U.S. PATENT DOCUMENTS

| 6,950,156 | B1 | 9/2005 | Yoshida |
| 7,221,417 | B2* | 5/2007 | Togashi ............ 349/106 |
| 2002/0171791 | A1 | 11/2002 | Anno et al. |
| 2004/0196422 | A1* | 10/2004 | Arai et al. ............ 349/114 |
| 2006/0001805 | A1* | 1/2006 | Yang et al. ............ 349/114 |

FOREIGN PATENT DOCUMENTS

| CN | 1406343 | 3/2003 |
| JP | 2002-169148 | 6/2002 |
| JP | 2002-333622 | 11/2002 |
| JP | 2003-233063 | 8/2003 |
| JP | 2004-117719 | 4/2004 |
| JP | 2005-107156 | 4/2005 |
| JP | 2005-227753 | 8/2005 |
| KR | 1020040091561 A | 10/2004 |
| KR | 1020040100489 A | 12/2004 |
| KR | 1020040110834 A | 12/2004 |

OTHER PUBLICATIONS

English Abstract for Publication No. 2003-233063.
English Abstract for Publication No. 2004-117719.
English Abstract for Publication No. 2002-169148.
English Abstract for Publication No. 2002-333622.
English Abstract for Publication No. 2005-107156.
English Abstract for Publication No. 2005-227753.
English Abstract for Publication No. 1020040091561 A.
English Abstract for Publication No. 1020040100489 A.
English Abstract for Publication No. 1020040110834 A.

* cited by examiner

*Primary Examiner*—Tina M Wong
(74) *Attorney, Agent, or Firm*—F. Chau & Associates, LLC.

(57) ABSTRACT

A display device having a transmissive area and a reflective area includes a first substrate, a reflective electrode formed on the first substrate, wherein the reflective electrode is disposed in the reflective area, a second substrate facing the first substrate, a plurality of color filters formed on the second substrate, wherein the plurality of color filters have light holes in the reflective area, and a common electrode formed on the second substrate, wherein an area of the tight holes is more than about 20% of an area of the color filter in the reflective area.

17 Claims, 5 Drawing Sheets

FIG. 6

TRANSFLECTIVE LIQUID CRYSTAL DISPLAY AND PANEL THEREFOR

CROSS-REFERENCE TO RELATED APPLICATION

The present application claims priority to Korean Patent Application No. 2006-0017149, filed on Feb. 22, 2006, the disclosure of which is incorporated herein by reference in its entirety.

BACKGROUND OF THE INVENTION

1. Technical Field

The present disclosure relates to a transflective liquid crystal display and a panel having the transflective liquid crystal display, and more particularly, to a transflective liquid crystal display having increased reflectivity and a method of fabricating the same.

2. Discussion of the Related Art

A liquid crystal display (LCD) device includes a pair of display panels provided with electric field generating electrodes, a polarizer and a liquid crystal layer interposed between the two display panels. In response to changes in the electric filed that are applied to the liquid crystal layer, an arrangement of liquid crystal molecules of the liquid crystal layer is changed to control the transmittance of light. The polarizer can block or transmit the light transmitted through the liquid crystal layer to display an image.

Since the LCD device is not self-emissive, light is provided to liquid crystal to display images. The light can be provided to the liquid crystal externally, or a light emitting device can be installed in the LCD device to provide internal light to the liquid crystal.

The LCD device can be a transmissive LCD device, a reflective LCD device and a transflective LCD device according to light sources including, for example, an internal light source, an external light source, or a combination thereof. An example of external light can be natural light such as, for example, daylight. An example of internal light can be artificial light such as, for example, light emitted from a lamp of a backlight unit.

The transmissive LCD device displays an image by using the internal light emitted from a backlight unit disposed behind an LCD panel. The reflective LCD device displays an image by using the external light that enters the LCD panel through the front side of the LCD panel. The transflective LCD device can be operated in a transmittance display mode in places without sufficient external light, and can be operated in a reflection display mode in places with sufficient external light. In the transmittance display mode, the transflective LCD device displays an image by using internal light. In the reflection display mode, the transflective LCD device displays an image by using external light.

The transflective LCD device includes a transmissive area and a reflective area in each pixel. The light emitted from the backlight unit in the transmissive area passes through color filters one time. The external light that enters the LCD panel in the reflective area passes through color filters two times.

The color tone can be affected by a difference of the number of times light passes through color filters when light passes through color filters in the transmissive area and the reflective area, respectively. Thus, a two-tone technology or a light hole technology can be used to reduce the difference of the color tone. The two-tone technology includes color filters in the transmissive area that are thicker than color filters in the reflective area. The light hole technology forms light holes in the color filters corresponding to the reflective area.

In the light hole technology, the size of the light holes can vary according to the color filters to obtain high color reproducibility. For example, when the color filters comprise red, green and blue color filters, the green color filter may have a largest light hole, and red color filter may have a smallest light hole. The reflectivity in the transflective LCD device is linearly proportional to the size of the light hole.

Therefore, the size of the light hole of the color filters can be controlled to obtain high reflectivity and to reduce yellowish color.

SUMMARY OF THE INVENTION

Exemplary embodiments of the present invention provide a transflective liquid crystal display capable of increasing reflectivity, and a panel having the transflective liquid crystal display.

According to an embodiment of the present invention, a display device having a transmissive area and a reflective area comprises a first substrate, a reflective electrode formed on the first substrate, wherein the reflective electrode is disposed in the reflective area, a second substrate facing the first substrate, a plurality of color filters formed on the second substrate, wherein the plurality of color filters have light holes in the reflective area, and a common electrode formed on the second substrate, wherein an area of the light holes is more than about 20% of an area of the color filter in the reflective area.

The plurality of color filters includes red, green and blue color filters and the areas of each of the light holes in the red, green and blue color filters can be substantially the same.

The area of the light holes can be about 20% through about 80% of an area of a color filter in the reflective area.

A value of the white Y of the reflective area can be more than about 45.

The display device includes a gate line and a data line that can be formed on the first substrate thereon, a thin film transistor that is connected with the gate line and the data line and a pixel electrode that is connected with the thin film transistor and the pixel electrode that includes the reflective electrode and the transparent electrode.

The display device may include a light blocking member formed on the second substrate.

The display device may include an upper passivation layer and a lower passivation layer disposed between the thin film transistor and the pixel electrode. The upper passivation layer may include a via hole to expose the lower passivation layer. The upper passivation layer may include a plurality of embossing patterns.

BRIEF DESCRIPTION OF THE DRAWINGS

Exemplary embodiments of the present invention can be understood in more detail from the following descriptions taken in conjunction with the accompanying drawings, in which.

DESCRIPTION OF THE EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein.

Figure 1:
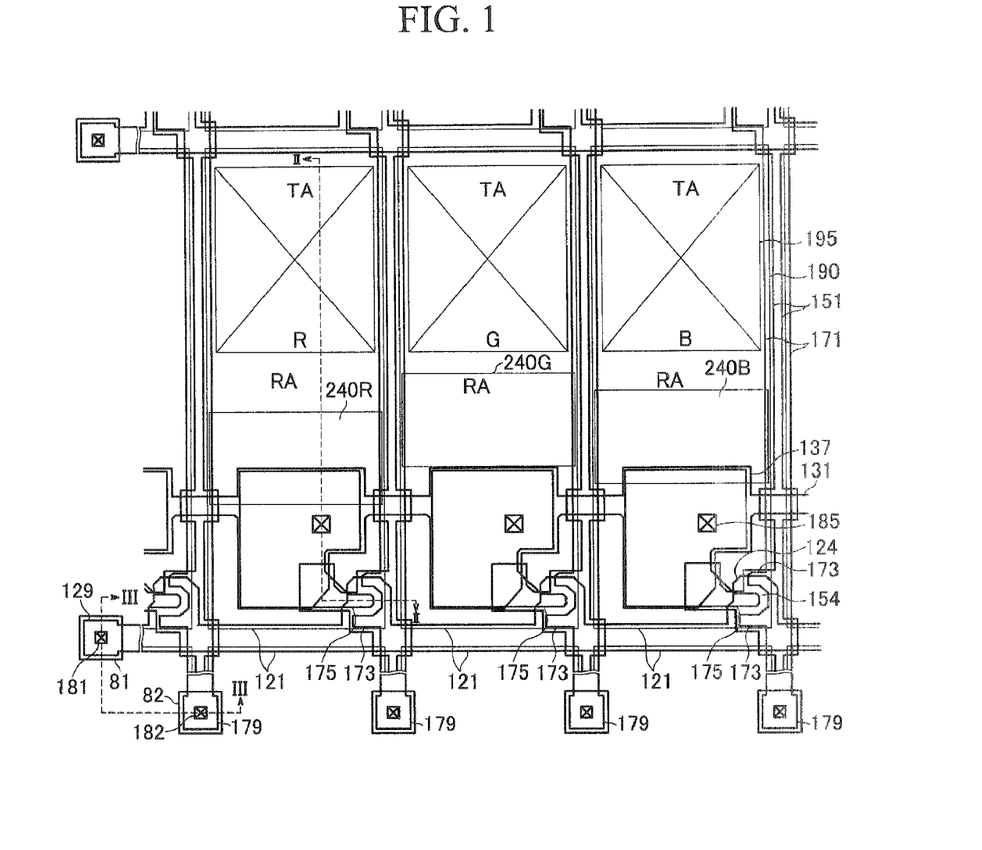
FIG. 1 is a plan view for illustrating a liquid crystal display in accordance with an exemplary embodiment of the present invention.
Figure 2:
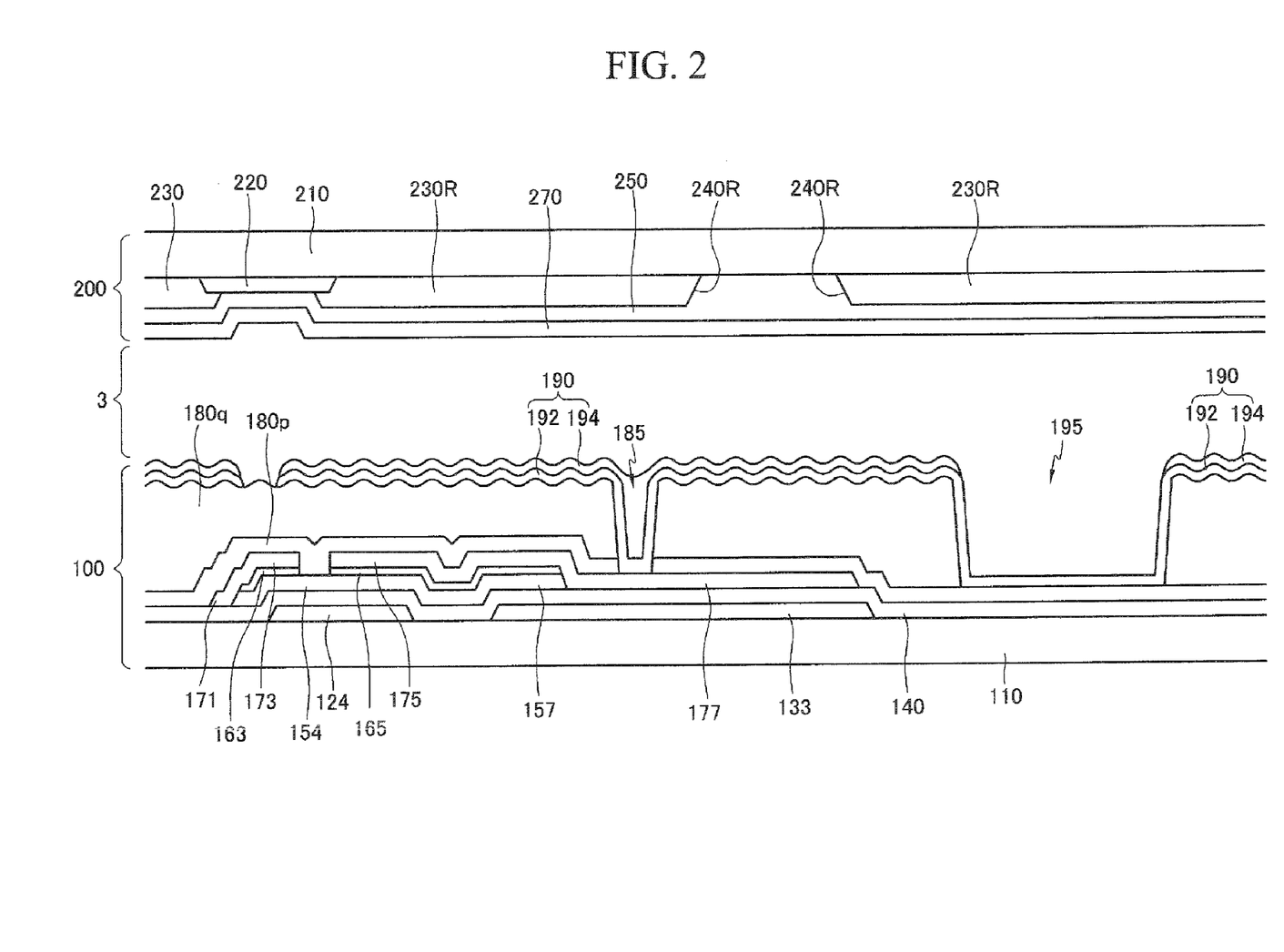
FIG. 2 is a cross-sectional view taken along the line—shown in FIG. 1.
Figure 3:
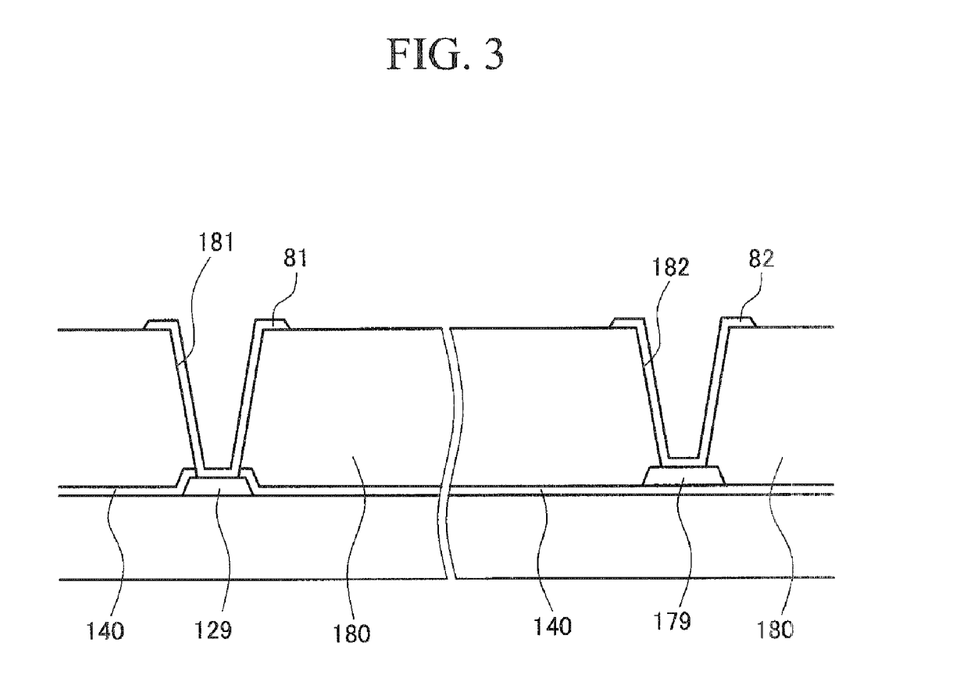
FIG. 3 is a cross-sectional view taken along the line III-III shown in FIG. 1.

FIG. 1 is a plan view illustrating a liquid crystal display in accordance with an exemplary embodiment of the present invention. FIG. 2 is a cross-sectional view taken along the line—shown in FIG. 1. FIG. 3 is a cross-sectional view taken along the line III-III shown in FIG. 1.

A liquid crystal display in accordance with an exemplary embodiment of the present invention includes a thin film transistor (TFT) display substrate 100, a common electrode display substrate 200, and a liquid crystal layer interposed between the TFT display substrate 100 and the common electrode display substrate 200.

Referring to FIG. 1 to FIG. 3, a plurality of gate lines 121 and a plurality of storage electrode lines 131 are formed on a substrate 110. The substrate 110 may comprise, for example, transparent glass or plastic.

The plurality of gate lines 121 transmit gate signals and extend along a first direction. Each of the gate lines 121 includes a gate electrode 124 protruded, for example, upwardly and a gate electrode pad 129 that has a large enough area for connecting with another layer or an external gate driving circuit (not shown). In an embodiment, the gate driving circuit (not shown) that generates the gate signals can be mounted on a flexible printed circuit film attached to the substrate 110. In an embodiment, the gate driving circuit can be mounted directly on the substrate 110 or can be integrated in the substrate 110.

When the gate driving circuit (not shown) is formed on the substrate 110, each of the gate lines 121 may extend to and connect with the gate driving circuit (not shown).

The plurality of storage electrode lines 131 receive a predetermined voltage and extend substantially parallel to the first direction. The storage electrode lines 131 include an expansion area 137. A shape or disposition of the storage electrode lines 131 can be changed according to an embodiment of the present invention.

The gate lines 121 and the storage electrode lines 131 may include for example, aluminum (Al), aluminum alloy, silver (Ag), silver alloy, copper (Cu), copper alloy, molybdenum (Mo), molybdenum alloy, chromium (Cr), chromium alloy, tantalum (Ta), tantalum alloy, tungsten (W), tungsten alloy, titanium (Ti) and/or titanium alloy. The gate lines 121 and the storage electrode lines 131 may have a multiple layer that includes, for example, a lower conductive layer (not shown) and an upper conductive layer (not shown).

In an embodiment, the lower conductive layer (not shown) may include a metal layer that has lower resistivity to reduce signal delay and voltage drop. The lower conductive layer (not shown) may have, for example, aluminum (Al), silver (Ag), Copper (Cu), and an alloy thereof. The upper conductive layer (not shown) may include a metal layer that has good contact characteristics with a pixel electrode, such as, for example, indium tin oxide (ITO) or indium zinc oxide (IZO). The upper conductive layer (not shown) may have, for example, molybdenum (Mo), chromium (Cr), tantalum (Ta), tantalum alloy, titanium (Ti) or an alloy thereof. An example of a combination that may be used for the multiple layers may include chromium (Cr) as the lower conductive layer and aluminum (Al) or aluminum alloy as the upper conductive layer, or aluminum (Al) or an aluminum alloy as the lower conductive layer and molybdenum (Mo) or a molybdenum alloy as the upper conductive layer.

The side portions of the gate lines 121 and the storage electrode lines 131 may be slanted toward the substrate 110. In an embodiment, the slant angle may be in a range of about 30° to about 80°. A gate insulating layer 140 can be formed on the gate lines 121 and the storage electrode lines 131. The gate insulating layer 140 may comprise, for example, silicon nitride (SiNx) or silicon oxide (SiOx).

A plurality of semiconductor layers 151 can be formed on the gate insulating layer 140. A semiconductor layer 151 may have, for example, a hydrogenated amorphous layer or a polysilicon layer. The semiconductor layer 151 extends along a second direction and has a projection area 154 that extends toward the gate electrode 124. The semiconductor layer 151 can cover the gate lines 121 and the storage electrode lines 131.

An ohmic contact layer 163, 165 can be formed on the semiconductor layer 151. The ohmic contact layer 163, 165 may include, for example, N+ amorphous silicon layer that is formed by implanting N+ impurities or a silicide layer. For example, phosphorus (P) may be implanted into an upper portion of the semiconductor layer 151 to form the ohmic contact layer 163, 165. In an embodiment, the ohmic contact layer 163 has a line shape, and the ohmic contact layer 165 has an Island shape.

The side portions of the semiconductor layer 151 and the ohmic contact layer 163, 165 may be slanted toward the substrate 110. In an embodiment, the slant angle may be in a range of about 30° to about 80°. Data lines 171 and a drain electrode 175 can be formed on the ohmic contact layer 163, 165 and the gate insulating layer 140.

The data lines 171 transmit data signals and extend along a second direction intersected with the gate lines 121. Each of the data lines 171 includes a plurality of source electrodes 173 extended toward a gate electrode 124 and a large enough area 179 for connecting with an external data driving circuit (not shown) or another layer. The data driving circuit (not shown) that generates the data signals can be mounted on a flexible printed circuit film attached on the substrate 110, be mounted directly on the substrate 110, or be integrated on the substrate 110 according to an embodiment of the present invention.

When the data driving circuit (not shown) is integrated in the substrate 110, each of the data fines 171 may extend to and connect with the data driving circuit (not shown). A drain electrode 175 is spaced apart from the data lines 171 and is disposed opposite the source electrode 173 with respect to the gate electrode 124. The drain electrode 175 may include an enlarged end portion 177 on one end and a bar-type end portion on the other end. The enlarged end portion 177 overlaps the expansion area 137 of the storage electrode lines 131, and the bar-type end portion is partially encompassed by the bent source electrode 173.

A TFT may include a gate electrode 124, a source electrode 173, a drain electrode 175 and a semiconductor layer 151 having a projection layer 154. A channel of the TFT is formed between the source electrode 173 and the drain electrode 175. The data lines 171 and the drain electrode 175 may include a refractory metal such as, for example, molybdenum (Mo), chromium (Cr), tantalum (Ta), titanium (Ti) and an alloy thereof. The data lines 175 and the drain electrode 175 may have multiple layers that include a refractory metal layer (not shown) and a conductive layer (not shown) having a low resistivity.

In an embodiment a combination that may be used for the multiple layers may include a double layer that includes a lower conductive layer having chromium (Cr) or a molybdenum (Mo) alloy and an upper conductive layer having an aluminum (Al) alloy, or a triple layer that includes a lower conductive layer having a molybdenum (Mo) alloy, an intermediate layer having an aluminum (Al) alloy and an upper conductive layer having a molybdenum (Mo) alloy.

The side portions of the data lines 171 and the drain electrode 175 may be slanted toward the substrate 110. In an embodiment, the slant angle may be in a range of about 30° to about 80°. The ohmic contact layers 163, 165 are formed between the semiconductor layer 154 and the drain electrode 175 to lower the contact resistivity. A width of the semiconductor layer 151 can be smaller than that of the data lines 171 except for an area that overlaps the gate lines 121. The semiconductor layer 154 in the overlapped area can smooth the surface of the semiconductor layer 154, thereby preventing disconnection of the data lines 171.

A passivation layer 180 is formed on the data lines 171, the drain electrode 175 and the semiconductor layer 154. The passivation layer 180 may have a lower layer 180p having an inorganic insulating layer, such as, silicon nitride (SiNx) or silicon oxide (SiOx) and an upper layer 180q having an organic insulating layer. In an embodiment, the organic insulating layer may include a layer having a dielectric constant less than 0.4 or a layer having photosensitivity. The upper layer 180q includes an open area 195 to partially expose the lower layer 180q and a surface having embossing patterns.

The passivation layer 180 may include a single layer having an inorganic layer or an organic layer. The passivation layer 180 may include a plurality of contact holes 182, 185 to expose the data electrode pad 179 and the drain electrode 175, respectively. The passivation layer 180 and the gate insulating layer 140 may include a plurality of contact holes 181 to expose the gate electrode pad 129.

A plurality of pixel electrodes 190 and a plurality of contact assistant members 81, 82 are formed on the passivation layer 180. Each of the pixel electrodes 190 has embossing patterns corresponding to the embossing patterns of the upper passivation layer 180q and may include a transparent electrode 192 and a reflective electrode 194. The transparent electrode 192 includes an electrically conductive and optically transparent material such as indium tin oxide (ITO) or indium zinc oxide (IZO).

The reflective electrode 194 may have, for example, aluminum (Al), silver (Ag), molybdenum (Mo), tungsten (W), neodymium (Nd), copper (Cu), and an alloy thereof. The reflective electrode 194 may have a multiple layer structure that includes an upper layer having a lower resistivity such as aluminum (Al), silver (Ag) and an alloy thereof, and a lower layer having a good contact characteristic with the transparent electrode 192 such as molybdenum (Mo), chromium (Cr), tantalum (Ta), titanium (Ti) and an alloy thereof. The reflective electrode 194 may be removed to expose the transparent electrode 192.

The pixel electrodes 190 are physically and electrically connected to the drain electrodes 175 which receive a data voltage. The pixel electrode 190 that receives the data voltage and a common electrode 270, which receives a common voltage, generate an electric field to control an arrangement of liquid crystal molecules of the liquid crystal layer 3 interposed between the two electrodes 190, 270. In response to changes in the electric filed that is applied to the liquid crystal layer 3, an arrangement of liquid crystal molecules of the liquid crystal layer 3 is changed to control the transmittance of light. The pixel electrode 190 and the common electrode 270 form a capacitor, which maintains an applied voltage after a thin film transistor is turned off.

A transflective LCD device includes a TFT display substrate 100, a common electrode display substrate 200 and the liquid crystal layer 3 interposed between the TFT display substrate 100 and the common electrode display substrate 200. The transflective LCD device may include a transmissive area (TA) and a reflective area (RA) defined by the transparent electrode 192 and the reflective electrode 194. In an embodiment, the transmissive area (TA) refers to an area where the transparent electrode 192 is exposed and the reflective area (RA) refers to an area where the reflective electrode 194 is formed.

The transflective LCD device in the transmissive area (TA) displays an image by using light emitted from a backlight assembly that is placed behind the LCD panel. The transflective LCD device in the reflective area (RA) displays an image by using external light that enters the LCD panel through the front side of the LCD panel and is reflected by the reflective electrode 194. The embossing patterns of the passivation layer 180 can increase the reflectivity of the reflective electrode 194.

Since the upper layer 180q of the passivation layer 180 is removed in the transmissive area (TA), a thickness of the liquid crystal layer 3 in the transmissive area (TA) is greater than that of the liquid crystal layer 3 in the reflective area (RA). In an embodiment, the thickness of the liquid crystal layer 3 in the transmissive area (TA) can be about twice of the thickness of the liquid crystal layer 3 in the reflective area (RA).

A storage capacitor can be formed by overlapping the storage electrode line 131 and the pixel electrode 190 or by overlapping the storage electrode line 131 and the drain electrode 175 connected to the pixel electrode 190. The storage capacitor can be an auxiliary capacitor to maintain the capacitance of the liquid crystal layer 3 for one frame.

The contact assistant members 81, 82 are connected with the gate pad electrode 129 and the data pad electrode 179 through the contact holes 181, 182, respectively. The contact assistant members 81, 82 can enhance connectivity between the gate pad electrode 129 and an external device and between the data pad electrode 179 and the external device. The contact assistant members 81, 82 can protect the gate pad electrode 129 and the data pad electrode 179 from externally provided heat or moisture.

A tight blocking member 220 is formed on a substrate 210 that includes an insulating material such as transparent glass or plastic to prevent light leakage. The blocking member 220 corresponds to the gate lines 121, the data lines 171, the storage electrode line 131 and the TFT of the TFT display substrate 100 so that the gate lines 121, the data lines 171 the storage electrode line 131 and the TFT may not be viewed from the exterior of an LCD panel. For example, the light blocking member 220 may include an opaque material such as, for example, chromium (Cr).

Color fitters 230 are formed on the substrate 210 and correspond to the pixel electrodes 190 arranged in a matrix. The color filters may include a red (R) color filter, a green (G) color filter and a blue (B) color filter.

Each of the color filters 230R, 230G, 230B in the reflective area (RA) includes light holes 240R, 240G, 240B, respectively. The tight holes 240R, 240G, 240B can compensate for a difference of the color tone caused by the number of times light passes through color filters when tight passes through color filters in the transmissive area (TA) and the reflective area (RA).

In an embodiment, the size of each of the light holes 240R, 240G, 240B in the R, G and B color filters may be substantially the same. The size of each of the light holes 240R, 240G, 240B can be about 20% of the size of the color filters 230R, 230G, 230B of the reflective area (RA).

In an embodiment, the area of each of the light holes 240R, 240G, 240B can be about 20% through about 80% of the area of color fitters 230R, 230G, 230B of the reflective area (RA). The color reproducibility of light may be less than about 15%, and a value of the white Y (WY) of the reflective area (RA) can be more than about 45 according to an embodiment of the present invention.

An overcoat layer 250 is formed on the substrate 210 to cover the color filters 230 and the light blocking member 220. The overcoat layer 250 may include an insulating layer such as an organic insulating layer. The overcoat layer 250 can protect the color filters 230, prevent the color filters 230 from being exposed and planarize a surface of the substrate 230. In an embodiment, the overcoat layer 250 can be omitted.

The thickness of the liquid crystal layer 3 can be controlled by forming the open area 195 according to an exemplary embodiment of the present invention. Alternatively, the thickness of the liquid crystal layer 3 can be controlled by a thickness of the overcoat layer 250. The overcoat layer 250 in the reflective area (RA) has a thickness thicker than that of the overcoat layer 250 in the transmissive area (TA). A common electrode 270 is formed on the overcoat layer 250 and may include, for example, Indium tin oxide (ITO) or Indium zinc oxide (IZO).

Inner surfaces of the two display panels 100, 200 are coated with an alignment layer (not shown) to align the liquid crystal layer 3. At least one polarizer (not shown) can be disposed on an outer surface of the two display panels 100, 200. An alignment of the liquid crystal layer 3 may be vertical or horizontal.

The LCD device may further comprise a plurality of spacers (not shown) to support a gap between the TFT display substrate 100 and the common electrode display substrate 200. The LCD device may further comprise a sealant (not shown) to couple the TFT display substrate 100 with the common electrode display substrate 200. The sealant can be positioned on an edge of the common electrode display substrate 200.

Figure 4:
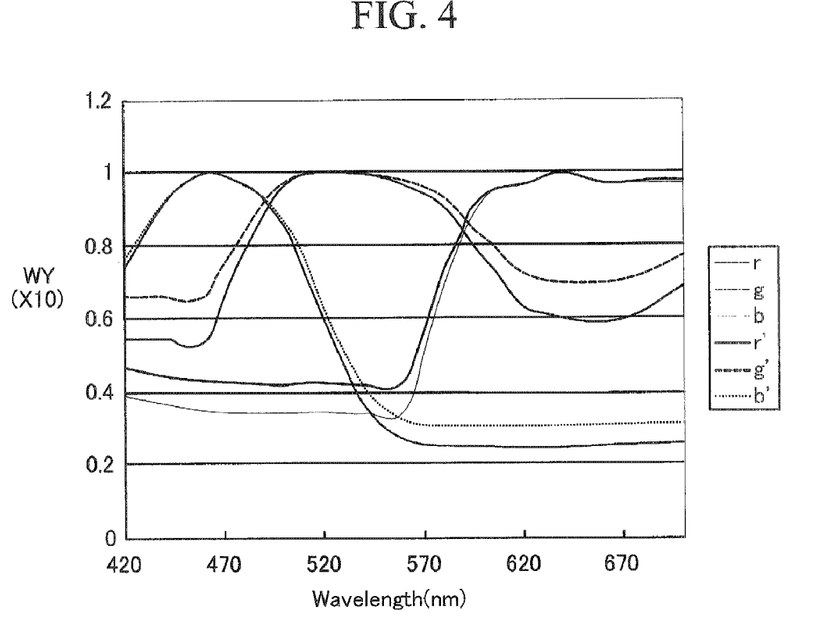
FIG. 4 is a graph for showing the characteristic curve of spectrum in relation to a size of the light hole in accordance with an exemplary embodiment of the present invention.
Figure 5:
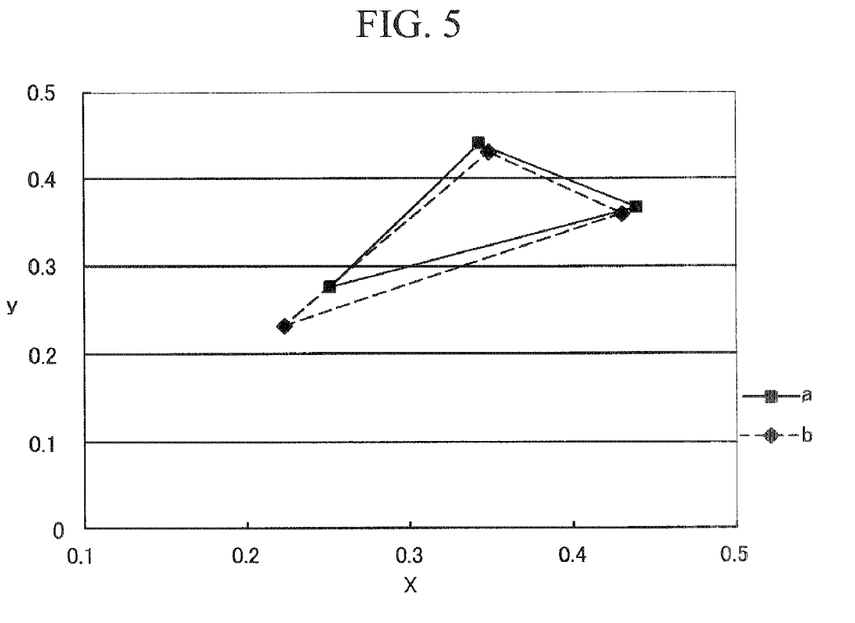
FIG. 5 is a graph for showing color coordinates according to a size of the light hole in accordance with an exemplary embodiment of the present invention.
Figure 6:
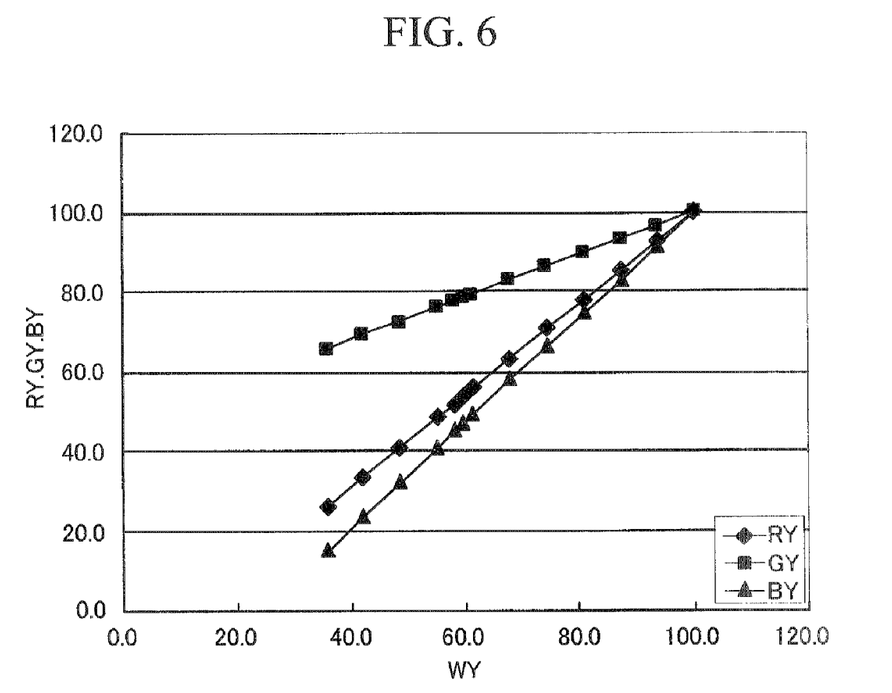
FIG. 6 is a graph for showing a diagram of a white Y according to a size of a light hole in accordance with an exemplary embodiment of the present invention.

FIG. 4 is a graph for showing the characteristic curve of spectrum according to an area of the light hole in accordance with an exemplary embodiment of the present invention. FIG. 5 is a graph for showing color coordinates according to an area of the light hole in accordance with an exemplary embodiment of the present invention. FIG. 6 is a graph for showing a white Y in relation to an area of the light hole in accordance with an exemplary embodiment of the present invention.

Referring to FIG. 4 and Table 1, there are shown a test result of change of a white Y according to an area of the light hole. When an area ratio of the light holes of R color filter, G color filter, and B color filter is 40%, 62%, 25%, respectively, and color reproducibility is 50%, the curves (r, g, b) and (r', g', b') represent changes of a white Y according to a wavelength of light passing through the color filters 230.

When an area ratio of the light holes of R color filter, G color filter, and B color filter is 32%, 50%, 20%, respectively, and color reproducibility is 50%, the curves (r, g, b) and (r', g', b') represent changes of a white Y according to a wavelength of light passing through the color filters.

TABLE 1

|  | Wx | Wy | Y |
|---|---|---|---|
| r(red) | 0.411 | 0.327 | 49.7 |
| g(green) | 0.313 | 0.381 | 82.9 |
| b(blue) | 0.208 | 0.213 | 32.2 |
| W(white) | 0.311 | 0.317 | 54.9 |
| r'(red) | 0.389 | 0.325 | 55.6 |
| g'(green) | 0.312 | 0.361 | 87.0 |
| b'(blue) | 0.220 | 0.226 | 36.4 |
| W(white) | 0.309 | 0.312 | 59.7 |

When an area of the light holes of color filters R, G, B increases, green chromatic coordinates (Wx, Wy) and white chromatic coordinates (Wx, Wy) decrease and blue chromatic coordinates (Wx, Wy) increase. When an area of the light holes increases, values of R, G, B color fitter and the white Y increase.

Table 2 shows a measurement result of reflectivity in the reflective area (RA).

TABLE 2

|  | Reflectivity (%) | |
|---|---|---|
| WY | When a polarizer is not used | When a polarizer is used |
| 59.7 | 20.5 | 8.4 |
| 54.9 | 18.8 | 7.4 |

When an area of the light holes increases a value of a white Y increases, and when a value of the white Y increases, reflectivity of the LCD device increases.

Referring to FIG. 5 and Table 3, when a color reproducibility of the LCD device is the same for the red, green and blue color filters, changes of reflectivity in the reflective area (RA) according to an area of the light holes is explained.

FIG. 5 is a graphical view showing changes of color coordinates according to an area of the light holes in accordance with an exemplary embodiment of the present invention. Table 3 shows a result of the changes of color coordinates.

Line (a) represents an area ratio of the light holes of color filters R, G, B, which is 32.0% 50.0%, 20.0%, respectively. Line (b) represents an area ratio of the light holes of color filters R, G, B, which is 35.0%, 61.0%, 11.2%, respectively,

TABLE 3

|  | Red(R) | | Green(G) | | Blue(B) | | Color Reproducibility (%) | Reflectivity (%) |
|---|---|---|---|---|---|---|---|---|
|  | Wx | Wy | Wx | Wy | Wx | Wy |  |  |
| a | 0.4407 | 0.3676 | 0.3433 | 0.4397 | 0.2520 | 0.2748 | 7.0 | 7.40 |
| b | 0.4310 | 0.3610 | 0.3370 | 0.4710 | 0.2050 | 0.2130 | 7.0 | 4.80 |

Referring to FIG. 5 and Table 3, as an area ratio of light holes of a red color filter increases from 32.0% to 35.0%, red chromatic coordinates (Wx, Wy) decrease. As an area ratio of light holes of a green color filter increases from 50.0% to 61.0%, green chromatic coordinate Wx decrease and green chromatic coordinates Wy increase.

When an area ratio of a light hole of a blue color filter decreases from 20.0% to 11.2%, blue chromatic coordinates (Wx, Wy) decrease. When an area ratio of a light hole of a red color filter and a green color filter increases and an area ratio of a light hole of a blue color filter decreases, the reflectivity decreases from 7.40% to 4.80%. That is, when the area ratio of a light hole of red and blue color filters increases and the area ratio of a light hole of green color filter decreases, the reflective of the LCD device may decrease.

FIG. 6 is a graph for showing a white Y in relation to an area of the light hole in accordance with an exemplary embodiment of the present invention.

Referring to FIG. 6, when an area of the light hole of the color filters R, G, B increases, white Y of the color filters is changed. The white Y in a blue color filter changes the most, and the white Y in a green color filter changes the least.

Reflectivity of the LCD device can be increased by controlling an area of a light hole of a blue color filter. Table 4 shows color coordinates and a white Y according to an area of light holes of color filters in the reflective area (RA). Table 4 represents color coordinates and white Y in the reflective area (RA) according to change of an area ratio of light holes which is formed in color filters of the reflective area (RA).

TABLE 4

| Area ratio of light hole | Wx | Wy | WY |
|---|---|---|---|
| 0% | 0.326 | 0.353 | 35.7 |
| 10% | 0.322 | 0.343 | 42.1 |
| 20% | 0.319 | 0.337 | 48.6 |
| 40% | 0.315 | 0.328 | 61.4 |
| 60% | 0.313 | 0.323 | 74.3 |
| 80% | 0.311 | 0.319 | 87.1 |

As an area ratio of tight holes of color filters in the reflective area (RA) increases, a value of white Y increases. Therefore, reflectivity of the LCD device increases. When an area of a light hole is less than 20%, color coordinates (Wx, Wy) in the reflective area (RA) is greater than 0.320, 0.340, thereby causing yellowish color.

An area of each of the light holes 240R, 240G, 240B in the red, green and blue color filters 230R, 230G, 230B is substantially the same in accordance with an exemplary embodiment of the present invention. An area of each of the tight holes 240R, 240G, 240B is more than about 20% when compared to an area of color filters 230R, 230G, 230B in the reflective area (RA). In an embodiment, an area of a light hole can be about 20% to about 80% of an area of the color filters 230R, 230G, 230B in the reflective area (RA).

According to an exemplary embodiment of the present invention, the LCD device is capable of increasing reflectivity without causing yellowish color, Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display device having a transmissive area and a reflective area, the display device comprising:
   a first substrate;
   a reflective electrode formed on the first substrate, wherein the reflective electrode is disposed in the reflective area;
   a second substrate facing the first substrate;
   a plurality of color filters formed on the second substrate and representing different colors, wherein the plurality of color filters have light holes in the reflective area; and
   a common electrode formed on the second substrate,
   wherein the light holes have a substantially same area and the area of the light holes is more than about 20% of an area of the color filter in the reflective area.

2. The display device of claim 1, wherein the plurality of color filters includes red, green and blue color filters.

3. The display device of claim 2, wherein the area of the light holes is about 20% through about 80% of the area of the color filter in the reflective area.

4. The display device of claim 1, wherein a value of a white Y of the reflective area is more than about 45.

5. The display device of claim 1, further comprising:
   a gate line and a data line formed on the first substrate;
   a thin film transistor connected with the gate line and the data line; and
   a pixel electrode connected with the thin film transistor, wherein the pixel electrode includes the reflective electrode and the transparent electrode.

6. The display device of claim 1, further comprising:
   a light blocking member formed on the second substrate.

7. The display device of claim 5, further comprising:
   an upper passivation layer and a lower passivation layer disposed between the thin film transistor and the pixel electrode.

8. The display device of claim 7, wherein the upper passivation layer includes a via hole to expose the lower passivation layer.

9. The display device of claim 8, wherein the upper passivation layer includes a plurality of embossing patterns.

10. A display device having a transmissive area and a reflective area, the display device comprising:
    a first substrate;
    a reflective electrode formed on the first substrate, wherein the reflective electrode is disposed in the reflective area;
    a second substrate facing the first substrate; and
    a plurality of color filters formed on the second substrate and representing different colors, wherein the plurality of color filters have light holes in the reflective area,
    wherein the light holes have a substantially same area and the area of the light holes is about 20% through about 80% of the area of the color filter in the reflective area.

11. The display device of claim 10, wherein the plurality of color fitters includes red, green and blue color filters.

12. The display device of claim 10, wherein a value of a white Y of the reflective area is more than about 45.

13. The display device of claim 10, further comprising:

a gate line and a data line formed on the first substrate;

a thin film transistor connected with the gate line and the data line; and a pixel electrode connected with the thin film transistor, wherein the pixel electrode includes the reflective electrode and the transparent electrode.

14. The display device of claim 10, further comprising:

a light blocking member formed on the second substrate.

15. The display device of claim 13, further comprising:

an upper passivation layer and a lower passivation layer disposed between the thin film transistor and the pixel electrode.

16. The display device of claim 15, wherein the upper passivation layer includes a via hole to expose the lower passivation layer.

17. The display device of claim 16, wherein the upper passivation layer includes a plurality of embossing patterns.

* * * * *